Aug. 7, 1956     R. B. MUSE     2,757,441
MULTIPLE STREAM CUT-OFF SAW
Filed Jan. 21, 1953     2 Sheets-Sheet 1
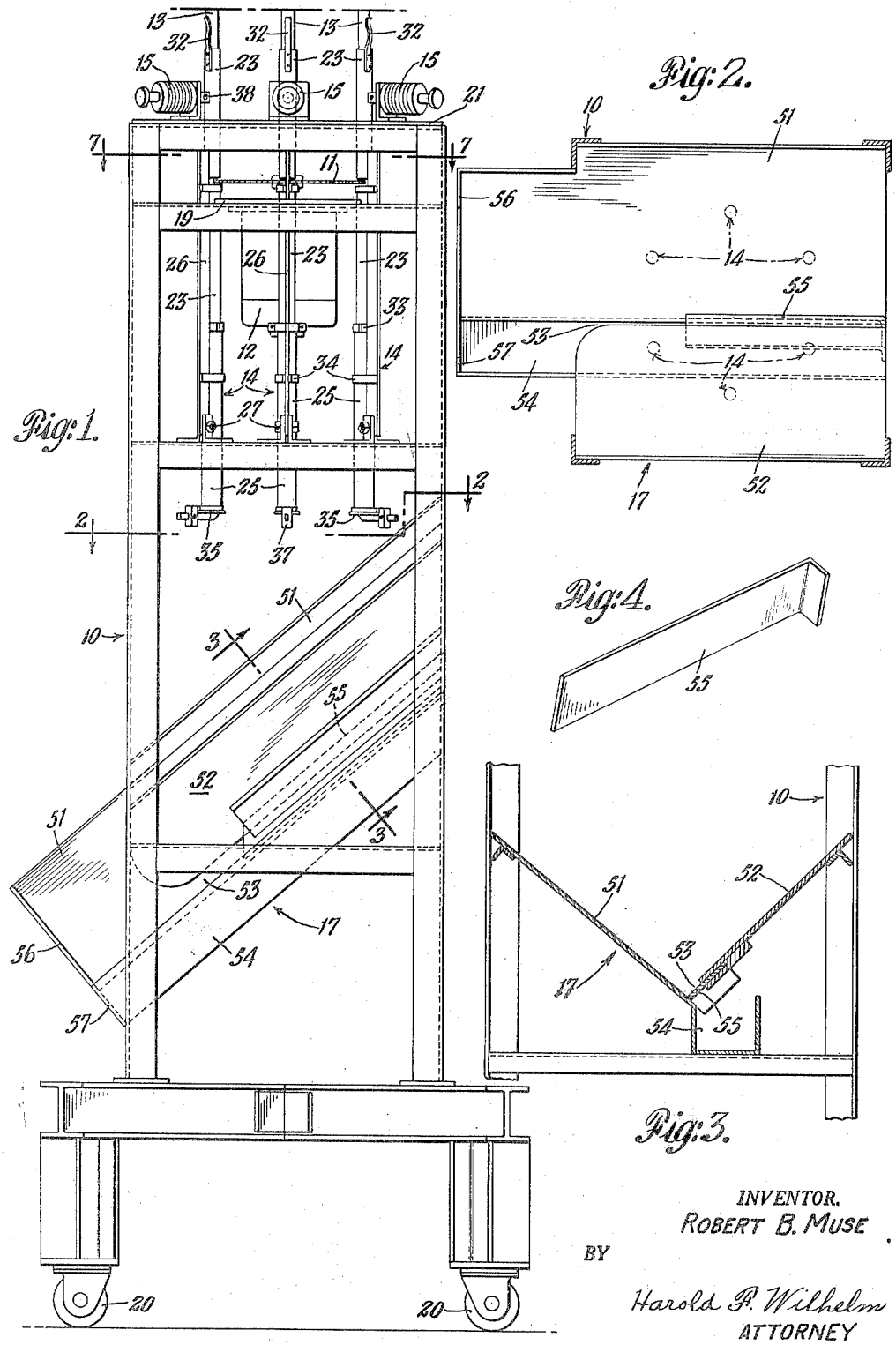
INVENTOR.
ROBERT B. MUSE
BY
Harold P. Wilhelm
ATTORNEY

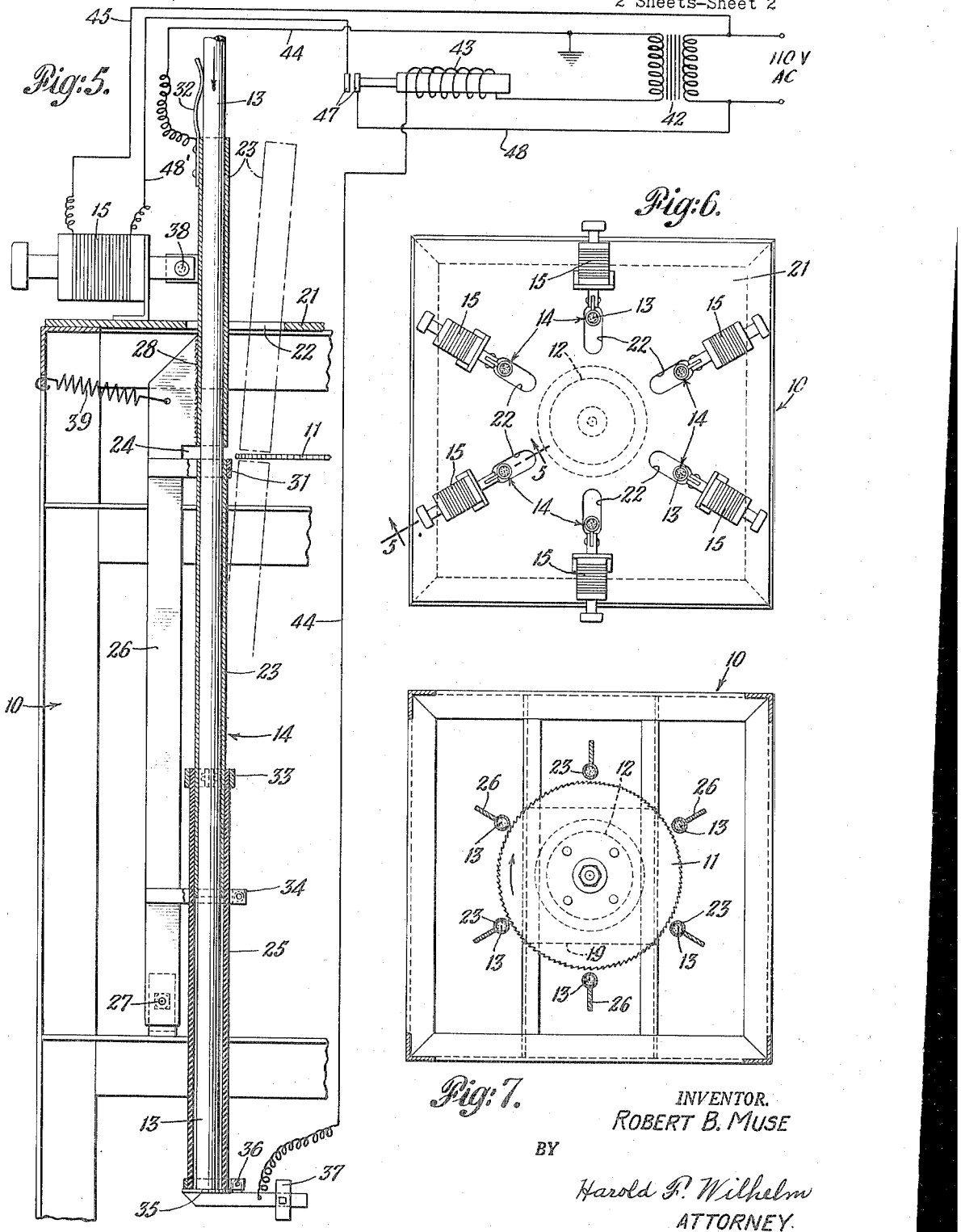

United States Patent Office 2,757,441
Patented Aug. 7, 1956

2,757,441

MULTIPLE STREAM CUT-OFF SAW

Robert B. Muse, Orinda, Calif., assignor to American Smelting and Refining Company, New York, N. Y., a corporation of New Jersey Application January 21, 1953, Serial No. 332,386

1 Claim. (Cl. 29—69)

The invention relates to cut-off and delivery mechanism for cutting off streams of flexible solid metal, such as solder, into lengths, and represents an improvement over my Patent No. 2,339,097, dated January 11, 1944.

The prior patent discloses a cut-off machine in which movement of the streams of solid material is substantially horizontal. A plurality of guide tubes are provided through which the several solid streams pass, each guide tube having associated therewith an open top trough on which an adjustable stop device is mounted. Each guide tube and its associated trough swings as a unit, causing the slot between the trough and the guide tube to receive the saw and cut the solid stream. The rocking movement of the guide troughs toward the saw brings them into such position that the cut-off lengths are dumped out of the troughs into a suitable receiving chute.

Objects of the present invention are, generally, to improve the construction and operation of the patented machine.

In its more specific aspects, the present invention provides for an upright disposition of the machine. The cut-off saw rotates about a fixed vertical axis and the series of guide tubes completely surround the cut-off saw. The solid streams enter the tops of the guide tubes by gravity. Electrical circuit means are provided which operate suitable solenoids for pushing the guide tubes toward the saw to cut off the lengths of solid stream. Provision is made for using the solid stream itself to complete the electric circuit. The guide tube is extensible so that the length of the cut-off pieces may be varied as desired. A lower counter-weighted contactor, or stop device, is provided for completing the circuit to initiate the cutting operation, after which the weight of the cut-off piece overcomes the weight of the counter-weight, permitting the cut-off piece to drop by gravity into the receiving chute.

In the drawings:

Fig. 1 is a side elevation of the cutting-off machine;

Fig. 2 is a section on the line 2—2 of Fig. 1 showing the chute into which the cut-off lengths drop;

Fig. 3 is a section on the line 3—3 of Fig. 1 through the chute;

Fig. 4 is a perspective of the slide member for uncovering the slot in the bottom of the chute;

Fig. 5 is an enlarged vertical section taken on the line 5—5 of Fig. 6 and showing the solenoid-operated guide tube;

Fig. 6 is a top plan view of Fig. 1 showing the arrangement of guide tubes with respect to the center of the saw; and Fig. 7 is a section on the line 7—7 of Fig. 1 below the top plate of the frame and showing the several guide tubes around the saw.

Referring now to the drawings, the cutting-off machine comprises, in general, a frame 10 on which is mounted a motor 12, driving saw 11; the frame supports six guide tubes 14, pivoted to the frame at 27 and operated by solenoids 15 to independently push the solid streams 13 into the rotating saw. A collecting chute 17 collects the cut-off lengths. The six solid streams 13 are fed into the machine vertically, from a point above the machine, with sufficient slack to cause them to feed into the guide tubes 14 by gravity.

It will be understood that a suitable extrusion press (not shown) is mounted adjacent the cutting-off machine. The extrusion press extrudes the streams of solid metal vertically upwardly, whence they are guided by suitable wheels over a power driven wheel so operated as to keep slack out of the streams between the power wheel and the press, and deliver the streams 13 to the guide tubes 14 by gravity.

The frame 10 is made up of suitable structural members supported by casters 20 for portability. The frame has a top plate 21 having a series of slots 22 through which the guide tubes 14 project. The solenoids 15 are mounted on the top plate to move the guide tubes 14 toward the saw. Below top plate 21 is a motor plate 19 which carries the motor 12 on whose shaft the saw 11 is mounted.

The six guide tubes 14, and operating mechanism therefor, are identical, so it is only necessary to describe one in detail. Each tube comprises an upper metal sleeve 23 having a saw slot 24; and a telescoping lower insulating sleeve 25 which may be of Bakelite or similar insulating material.

The upper metal sleeve 23 is in two parts, the upper part being welded, as at 28, to the upright arm 26. The lower end of arm 26 is pivoted to the frame 10 at 27. The lower part of metal sleeve 23 is secured to upright arm 26 by a suitable clamp 31. Spring contact 32 is secured to the upper end of sleeve 23 to make electrical contact with the solid stream 13.

The lower sleeve 25 is adjustable with respect to upper sleeve 23, to vary the length of the cut-off pieces as desired. The lower sleeve 25 surrounds upper sleeve 23 and has a clamp 33 at its upper end. A second clamp 34 is secured to upright arm 26. By unloosening clamps 33 and 34, the position of the lower sleeve 25 may be adjusted, and by tightening the clamp the lower sleeve is clamped in the desired position.

A clamp surrounds the lower end of lower sleeve 25 and has a pivot 36 on which is mounted metal contactor 35. Contactor 35 has an adjustable counter-weight 37 by which the upward pressure exerted by contactor 35 may be adjusted. It will be understood that the solid stream 13 contacts the contactor 35, closing an electrical circuit, as described hereinafter; this operates solenoid 15 to push the solid stream into the saw 11 to cut off a length. The upward force exerted by the contactor 35 is such that the weight of the cut-off length overcomes the counter-weight 37, permitting the cut-off length to fall by gravity into the chute 17.

The solenoid 15 is of standard construction and is mounted on the top plate 21. The armature is pivoted to sleeve 23 at 38. Energization of the solenoid 15 acts to push the guide tube 14 to the right in Fig. 5, to the position indicated by the dot-and-dash lines, causing the saw 11 to sever the solid stream 13. Return spring 39, connecting the frame 10 and upright arm 26, returns the guide tube 14 to normal position, as indicated in Fig. 5. It will be understood that the flexibility of the solid stream 13, and its slackness above the guide tube, permits this small lateral movement of the guide tube.

The movement of the guide tube 14 is controlled automatically by an electric circuit. This comprises a 110 volt A.-C. power source feeding a transformer 42. The transformer reduces the voltage to a value, for example, of 12 volts in the secondary circuit. The secondary of the transformer is connected in circuit as follows: From one side of the secondary to the winding of a relay 43 and thence by wire 44 to contactor 35, thence through the solid metal stream 13 to spring contact 32, thence by wire 44 to ground, which is the other side of the secondary of transformer 42.

The 110 volt A.-C. source also feeds the winding of solenoid 15. This circuit is as follows: Wire 48 leads to contacts 47 of the relay 43, thence by wire 48' to solenoid 15, thence by wire 45 back to the 110 volt source.

Referring now to the collecting chute 17, this comprises plates 51 and 52 forming an inclined bottom having a slot 53. Under slot 53 is a depending trough 54 connected to plate 51. Plate 51 has a lower end wall 56 and trough 54 has a lower end wall 57. An adjustable gate 55 is slidably mounted in ways secured to plate 52 to close slot 53.

In operation, it will be assumed that the solid stream 13 has just touched contactor 35. This completes the circuit through relay 43, closing contacts 47; this closes the circuit through the winding of solenoid 15, energizing the solenoid and pushing tube 14 inwardly so that slot 24 receives saw 11, thus cutting off a length from the solid stream 13. The cut-off length or rod being free, its weight overcomes the force of counter-weight 37, and the length drops down into the chute 17 and thence into trough 54.

The severance of the length of solid stream, and its entry into insulating sleeve 25, opens the circuit through relay 43, which opens contacts 47, which in turn de-energizes solenoid 15; this causes return spring 39 to pull the guide tube 14 away from the saw, freeing the upper part of solid stream 13 (which has been momentarily stopped and prevented from falling by pressure against the saw) and letting it drop down into lower sleeve 25 to touch contactor 35, thus completing the cycle.

Surfaces 51 and 52 of chute 17 may be covered with glass plates cut to fit. The glass plates may be wire-reinforced, to insure against breakage. These glass surfaces have two functions. They offer the smoothest possible sliding surfaces for the cut-off rods and insulate against accidental electric contact in case an occasional long cut-off rod does not fall clear of the guide tube 14 as promptly as it should. This happens when trough 54 is allowed to become too full, at which time the rods do not clear the chute 17 and pile up in the chute.

The purpose of the adjustable slide gate 55 is to prevent as many rods as possible from entering the slot 53 until they are well on their way to the lower end of the chute 17. The gate 55 is to be adjusted so as to allow a minimum length of slot for the rods to fall through, after they have struck the end plates 56 or 57. The gate 55 may be omitted in some cases.

The advantages of the present invention are, briefly, the saving in space caused by the vertical disposition of the streams; the greatly increased number of streams that can be disposed around the saw; the delivery by free fall of the cut lengths; the simplified electric control, and the easily extensible guide tubes. It will be understood that the several guide tubes each have their own electric circuit which operates independently; and furthermore, that the different guide tubes may be adjusted to different lengths so as to produce different lengths of cut-off material simultaneously.

In the above description, specific terms have been used for clarity of disclosure. In the following claim, all terms should be interpreted as broadly as the prior art will permit.

What is claimed is:

In a cutting-off machine, a power driven cut-off saw having an upright axis of rotation, an upright guide adapted to receive and guide a continuous length of material past said saw, said guide having a saw-receiving recess, means mounting said saw and guide for relative movement for effective movement of said saw into said recess to sever said material into desired lengths, contact means above and below said guide recess mounted for engaging and making electrical contact with said material, a solenoid for effecting the movement of the saw into cutting relation with the material when energized, means normally separating said guide and saw to non-sawing engagement, and circuit means in series with said upper and lower contact means and including the unsevered material in series circuit with said upper and lower contact means to energize the solenoid to engage said saw in said recess, said lower contact being located a sufficient distance from said recess to sever a desired length of said stream whereby upon severing said material said circuit is broken and said guide and saw become disengaged.

References Cited in the file of this patent

UNITED STATES PATENTS

| | | |
|---|---|---|
| 1,653,257 | Davis | Dec. 20, 1927 |
| 1,745,873 | Stoltz | Feb. 4, 1930 |
| 2,163,967 | Strawn et al. | June 27, 1939 |
| 2,339,097 | Muse | Jan. 11, 1944 |